United States Patent [19]

Martenne

[11] Patent Number: 5,742,862
[45] Date of Patent: Apr. 21, 1998

[54] PHOTOGRAPHIC CASSETTE AND CAMERA EQUIPPED WITH A CASSETTE ACCORDING TO THE INVENTION

[75] Inventor: Alexandre Francois Martenne, Chalon Sur Sanone, France

[73] Assignee: Eastman Kodak Company, Rochester, N.Y.

[21] Appl. No.: 590,718

[22] Filed: Jan. 24, 1996

[30] Foreign Application Priority Data

Feb. 2, 1995 [FR] France .................................. 9501404

[51] Int. Cl.⁶ .............................. G03B 1/24; G03B 17/26
[52] U.S. Cl. ........................ 396/512; 396/387; 352/241; 242/348.3
[58] Field of Search ...................... 354/212, 275; 352/235, 241; 396/512, 513, 514, 515, 516, 387; 242/348.3, 348.4

[56] References Cited

U.S. PATENT DOCUMENTS

| | | | |
|---|---|---|---|
| 1,144,414 | 6/1915 | Holmes | 352/241 |
| 1,229,275 | 6/1917 | Jenkins | 352/241 |
| 1,499,941 | 7/1924 | Marette | 354/235 |
| 3,508,820 | 4/1970 | Tsunoda | 352/235 |
| 3,999,844 | 12/1976 | Batter | 352/241 |
| 5,223,876 | 6/1993 | Komatsuzaki | 354/275 |
| 5,255,040 | 10/1993 | Pagano | 242/348.3 |

FOREIGN PATENT DOCUMENTS 1 223 251  8/1966  Germany.

Primary Examiner—A. A. Mathews
Attorney, Agent, or Firm—Roger A. Fields

[57] ABSTRACT

The invention concerns a cassette for photographic film.

The cassette for photographic film according to the invention comprises: a winding spool (45); a photographic film (41) designed to be wound on said winding spool, means being provided for fixing one end of the film to said spool, said film being provided with perforations (48) formed at intervals along at least one of its longitudinal edges, and designed to cooperate with drive means (46) provided on a camera (42), a perforated leader (43) enabling the film to be engaged with said drive means (46) of said camera for the purpose of its winding onto a receiving spool (44), at least one of the perforations (60) of the leader intended for the initial engagement of the film (41) with the drive means (46) being longer along the longitudinal axis of the film than the other perforations (48).

4 Claims, 6 Drawing Sheets

PHOTOGRAPHIC CASSETTE AND CAMERA EQUIPPED WITH A CASSETTE ACCORDING TO THE INVENTION

FIELD OF THE INVENTION

The invention concerns, in a general manner, the field of photography, and in particular the field of photographic cassettes. More particularly, the invention concerns a cassette for photographic film, of the 35 mm type, having means enabling the film to be hooked more easily onto a winding device provided on a camera intended to receive such a cassette.

The invention also concerns a camera equipped with such a cassette. Such a camera is particularly well adapted to those cameras known as Single-Use Cameras (SUC) or disposable cameras. It is, however, evident that such a photographic cassette can be used for other cameras.

BACKGROUND OF THE INVENTION

FIGS. 1 and 2, to which reference is now made, depict diagrammatically a camera of the SUC type. The outer packaging 10 of the camera, preferably produced from card, generally carries graphic images, trade marks, brand names and other distinctive signs designed to identify the manufacturer. Such packaging 10 comprises a front face 12 and a rear face 14, forming a lightproof box. The front face 12 is provided with openings suitable for an exposure lens 16 and a viewfinder 18. The top wall 20 of the box 10 comprises two openings 22, 24 for receiving a button designed to operate the shutter and for displaying the number of exposures remaining, respectively. An opening 28, corresponding to the viewfinder 18, is provided at the rear of the box. An opening is also provided for receiving a device 30, of the toothed wheel type, designed to control the winding on of the film between two exposures.

FIG. 3 depicts diagrammatically the internal arrangement of a disposable camera of the type described with reference to FIGS. 1 and 2. The model illustrated principally comprises a cassette 40 for photographic film 41 mounted so as to rotate inside a lightproof plastic box 42. The free end of the film ends in a leader 43 (approximately 6 cm in length) emerging from the cassette and designed for hooking the film onto a toothed wheel 46 in order to wind it onto a receiving spool 44 after each exposure. Alternatively, during the manufacturing process, once the film has been loaded into the camera, it is wound completely onto the receiving spool 44. After each exposure, the film is rewound onto the spool 45 of the cassette 40.

The loading of a SUC is generally carried out in the following way: the end of the leader 43 emerges from the cassette 40 through the narrow opening 47 formed over substantially the whole length of the cassette 40; an operator pulls the leader over a sufficient length and engages at least one perforation 48 with at least one tooth 49 on the toothed wheel 46 mounted facing the path of the film, between the cassette 40 and the receiving spool 44; the end of the leader 43 is also hooked onto the receiving spool 44 by means of an engaging tooth and a slot in which the free end of the leader is inserted; once this hooking has been effected, a rear cover 50 of the box is closed; the spool 44 is driven, for example by means of a motor (not depicted), so as to wind the whole unexposed film onto the spool 44. During these loading operations, the shot-by-shot wind-on mechanism 150 is disengaged. Such loading operations can, of course, be carried out in a completely automated manner.

As well known, when the drive means 46 makes a predetermined number of revolutions, the film advancing mechanism and the shutter actuating mechanism with its associated elements are self clocked in a well known manner to those skilled in the art so as to ready the film package 1 for the next exposure.

Such cameras of the Single-Use Camera type have been the subject of numerous publications in patent literature. For example, U.S. Pat. Nos. 4,833,495, 4,855,774, 4,751,536, 4,972,649, 5,146,256, 5,021,811, 4,901,097, 4,973,998, 5,313,240, 5,255,041 and 5,235,366 can be cited.

A problem with such cameras arises in the hooking and leading of the film onto the toothed wheel 46. This is because, due to the size of the perforations, it is sometimes difficult to make the perforations 48 in the leader coincide with the teeth 49 on the wheel 46. In reality, the angular position of the toothed wheel is determined so as to allow the reverse rotation of the shot numbering mechanism; the leader must be unwound sufficiently far in order to enable its end to be hooked onto the spool 44. As a result, the perforations 49 do not necessarily coincide with the position of the teeth on the wheel 46. If the installation of the film is automatic, it may happen that, when the rear cover 50 of the box is closed, the leader is caught between the teeth of the wheel 46 and the cover 50. When the film is then wound onto the receiving spool 44, this causes the film to be damaged (torn perforations), or the hooking tooth of the spool 44 to be broken. Such a situation then necessitates the removal of the rear cover 50 of the box and the changing of the film or damaged component. All these operations take time and can represent a significant increase in the manufacturing cost of the camera.

U.S. Pat. No. 5,255,040 describes a photographic film cassette of the type having a leader fixed to the free end of the film for engaging the film with winding means provided on a camera designed to receive such a cassette. According to the approach described in this document, the perforations produced on the leader are such that those situated in the vicinity of the end of the film are longer (along the longitudinal axis of the film) than the other perforations. According to this document, the width of the leader is greater than that of the film and it is wound round a toothed wheel. Such an arrangement of perforations enables the fact that the winding diameter of the leader increases with the length already wound to be taken into account. On the other hand, the perforations situated at the free end of the leader (the one furthest from the film), that is to say those which participate in the initial engagement of the film or, in other words, its hooking (in order to be wound) onto the winding means of the camera, are identical in size to the other perforations in the film. In conclusion, even though the solution described in this document makes a contribution to resolving the problem associated with the correct winding of the film onto a toothed wheel, whatever the length of the leader, it in no way resolves the problems associated with the initial hooking on of the leader prior to its winding, as mentioned above.

Thus one of the objects of the present invention is to provide a cassette for photographic film that eliminates the installation problems mentioned above with reference to the prior art.

Another object of the present invention is to be able to completely automate the process of loading a photographic film into a camera such as a SUC.

A further object of the present invention is to provide a Single-Use-Camera equipped with a film cassette according to the invention.

Yet another object of the present invention is to provide a method of loading a film into a camera of the SUC type.

3

Other objects of the invention will emerge in detail in the description that follows.

SUMMARY OF THE INVENTION

These objects are achieved according to the present invention by means of a cassette for photographic film comprising:

a) a winding spool provided with flanges at each of its ends;

b) a photographic film designed to be wound on the winding spool, means being provided for fixing one end of the film to the said spool, the film being provided with perforations formed along at least one of its longitudinal edges, and designed to cooperate with drive means provided on a camera adapted to receive the cassette, a perforated leader enabling the film to be engaged with the drive means of the camera for the purpose of its winding onto a receiving spool;

c) a cylindrical shell inside which the spool is mounted so as to rotate in a lightproof way, the shell having a narrow lightproof opening formed over substantially the whole of its length in order to allow the passage of the film;

the cassette being characterised in that at least one of the perforations of the leader that are intended for the initial engagement of the film with the drive means, is longer along the longitudinal axis of the film than the other perforations.

According to a first embodiment, the longer perforation is obtained by removing the material situated between at least two successive perforations in the leader.

According to another embodiment of the invention, the leader is provided with a row of perforations along at least one of its longitudinal edges, each of the rows being disposed at a given distance from the corresponding edge of the film, the material situated between the longer perforation and the corresponding edge of the film being removed by cutting or punching.

The longer perforation is advantageously produced by removing the material situated between three successive perforations in the leader.

Also advantageously, the removal of material is effected by cutting or punching.

The invention also concerns a Single-Use Camera equipped with a photographic cassette according to the present invention.

BRIEF DESCRIPTION OF THE DRAWINGS

In the description that follows, reference will be made to the drawings in which.

DETAILED DESCRIPTION OF THE PREFERRED EMBODIMENTS

Figure 4:
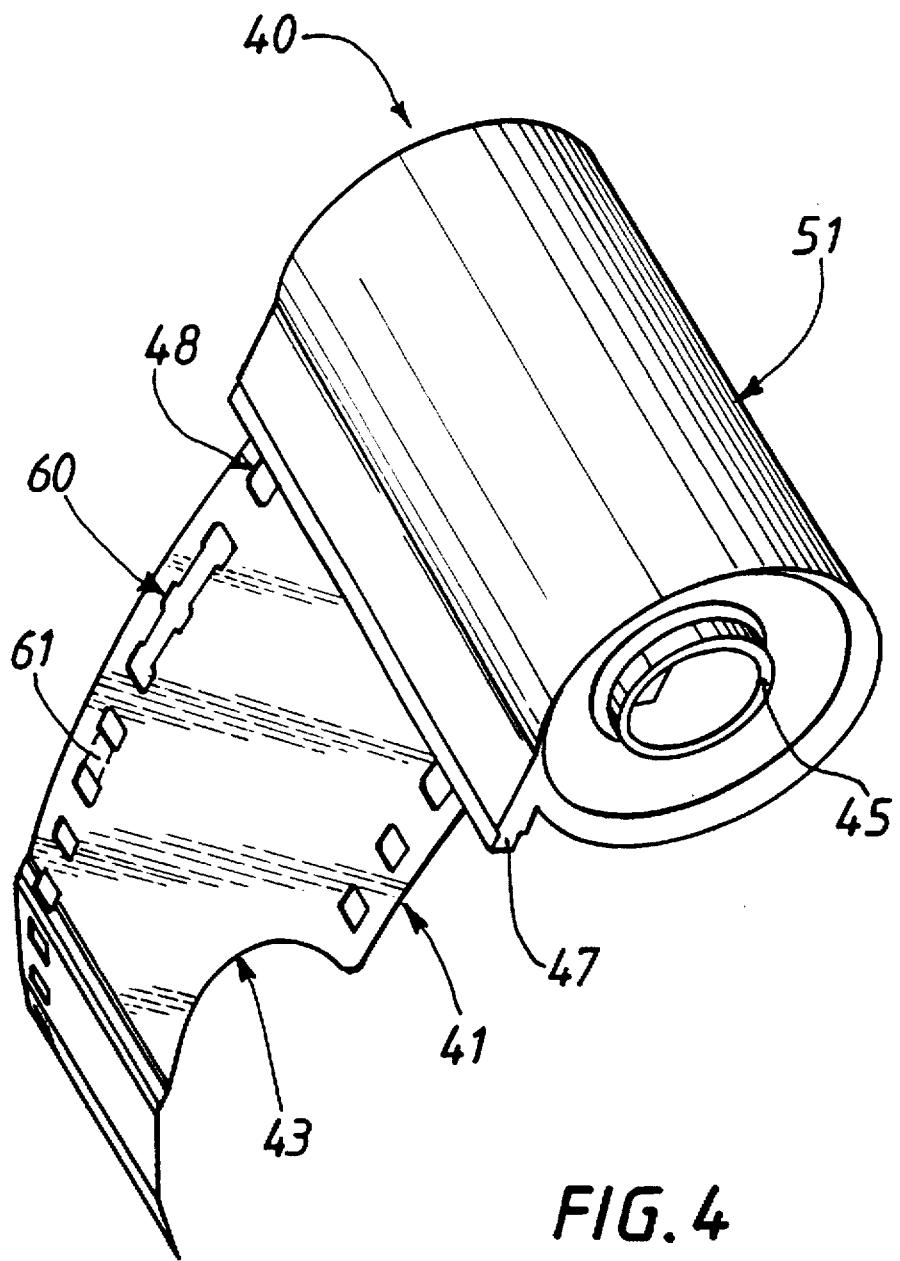
FIG. 4 depicts a first embodiment of the photographic film cassette according to the present invention.

FIG. 4, to which reference is now made, illustrates diagrammatically a first embodiment of the present invention.

Figure 1:
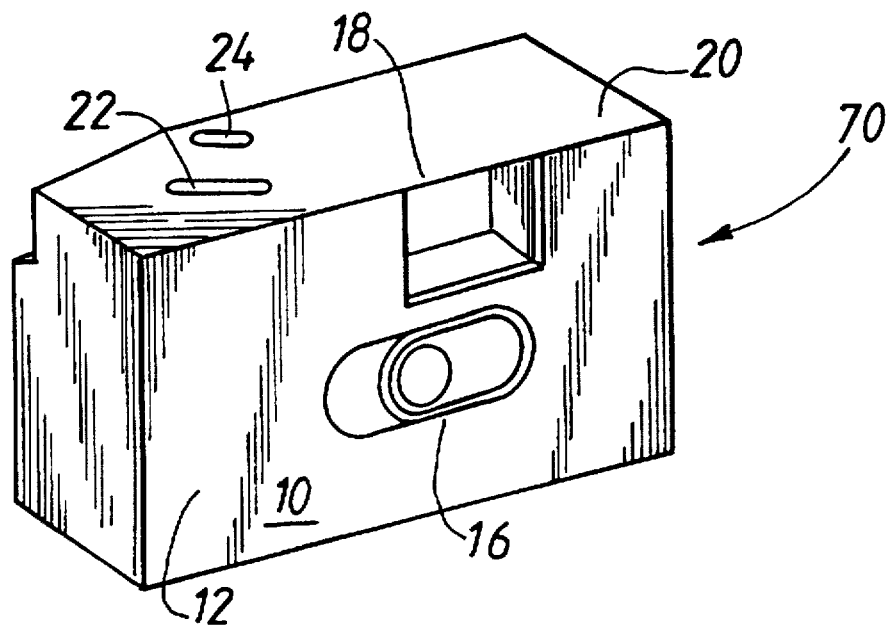
FIG. 1 depicts diagrammatically a first view of a camera of the Single-Use Camera type.
Figure 2:
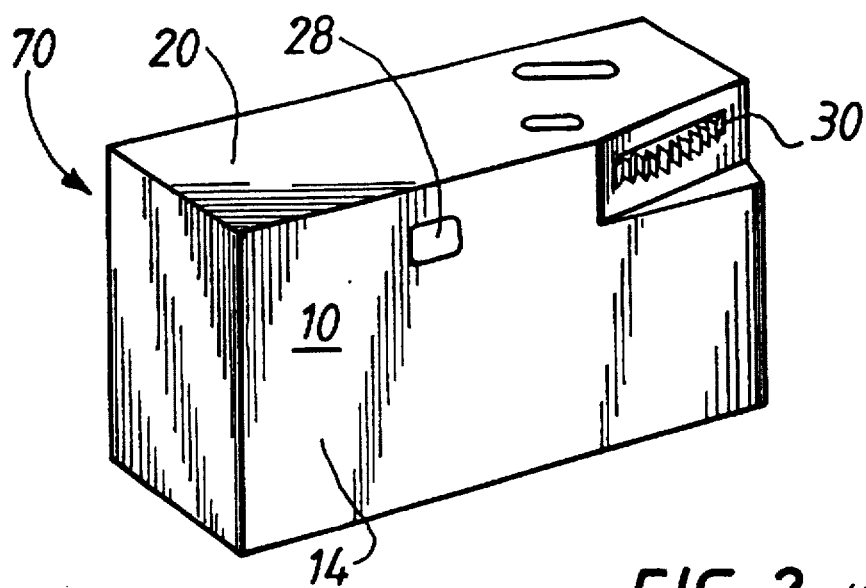
FIG. 2 depicts diagrammatically a second view of the camera depicted in FIG. 1.
Figure 3:
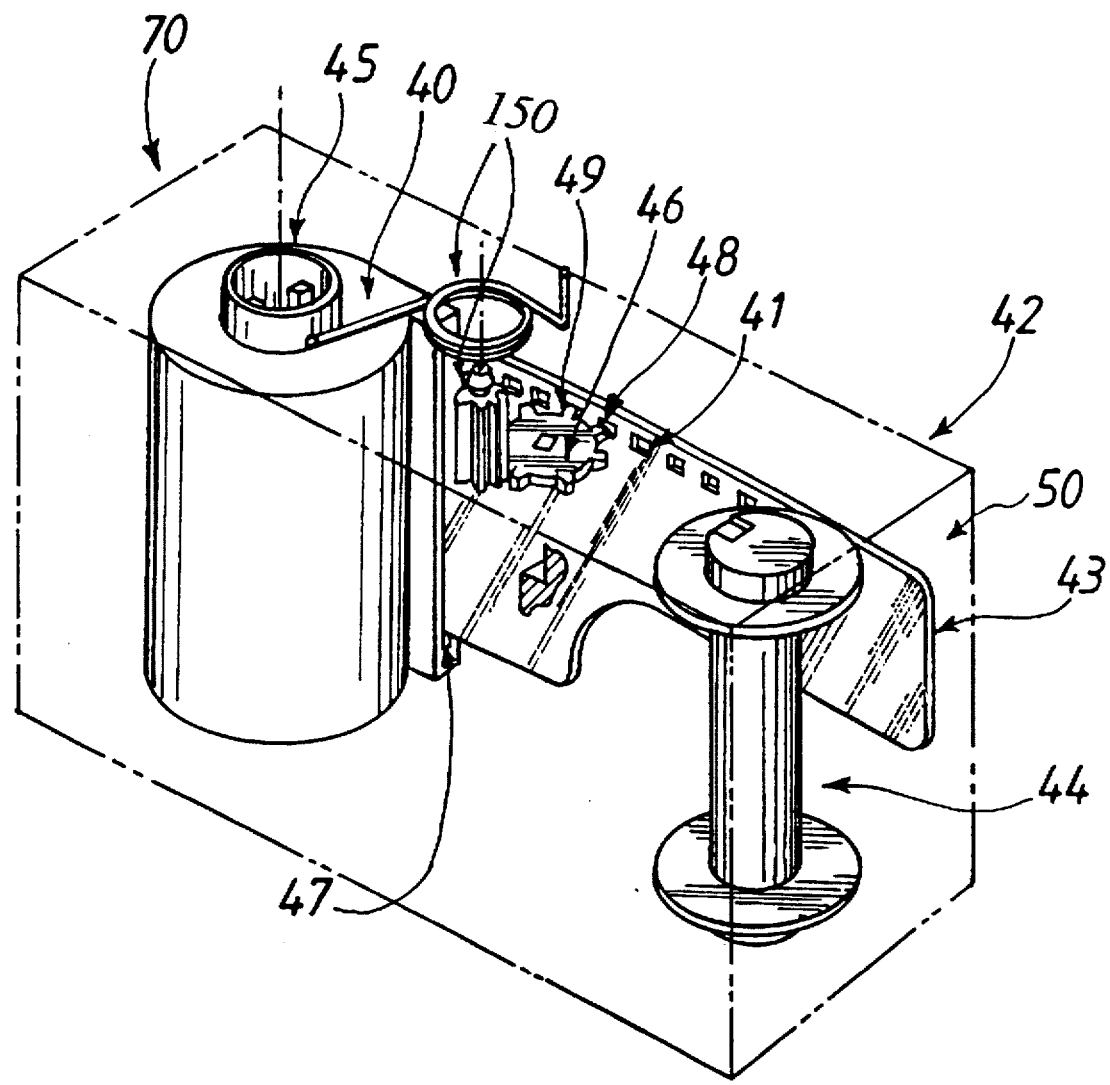
FIG. 3 depicts diagrammatically a third view of the camera illustrated in FIGS. 1 and 2.

According to the embodiment depicted, the cassette for photographic film comprises a winding spool 45 provided with flanges at each of its ends. A photographic film 41 is wound onto the winding spool 45, means (not depicted) being provided for fixing one end of the film to the spool 45. The film is provided with perforations 48 formed at intervals along at least one of its longitudinal edges, and designed to cooperate with drive means (46, FIG. 3) provided on a camera adapted to receive said cassette. Typically, this involves a toothed wheel 46 placed in the path of the film. A perforated leader 43 enables the film to be engaged with said drive means for the purpose of its winding onto a receiving spool. The spool 45 is mounted so as to rotate inside a lightproof cylindrical shell 51, said shell having a narrow lightproof opening 47 formed over substantially the whole of its length so as to allow the passage of the film.

According to an important characteristic of the present invention, at least one of the perforations 60 in the leader 43 designed for the initial engagement of the film with the drive means 46 is longer along the longitudinal axis of the film than the other perforations, the longest perforation being intended to be produced in the area of the leader which, during the initial loading of the film, is at the same level as, or coincides with, the toothed wheel 46.

Advantageously, this perforation which participates in the initial engagement of the film (through the leader) with the toothed wheel, for the purpose of its winding onto the receiving spool 44, is of a length that is at least equal to the length of the film engaged by the teeth of the wheel at a given moment. In other words, its length is at least equal to the length of the portion of toothed wheel intercepting the winding plane of the film.

Various techniques can be used for the production of such a perforation. Advantageously, this longer perforation, used to lead the film onto the toothed wheel 46, is obtained by removing the material between two successive perforations, which produces, according to the perforation standards of 35 mm photographic films, an initial engagement perforation approximately 6.7 mm long (along the winding axis of the film). This can be produced by cutting, punching, or any other appropriate technique. Also preferably, the material situated between three successive perforations is removed, thereby producing, according to the perforation standards of 35 mm photographic films, an initial engagement perforation approximately 11.5 mm long (along the winding axis of the film).

Figure 5:
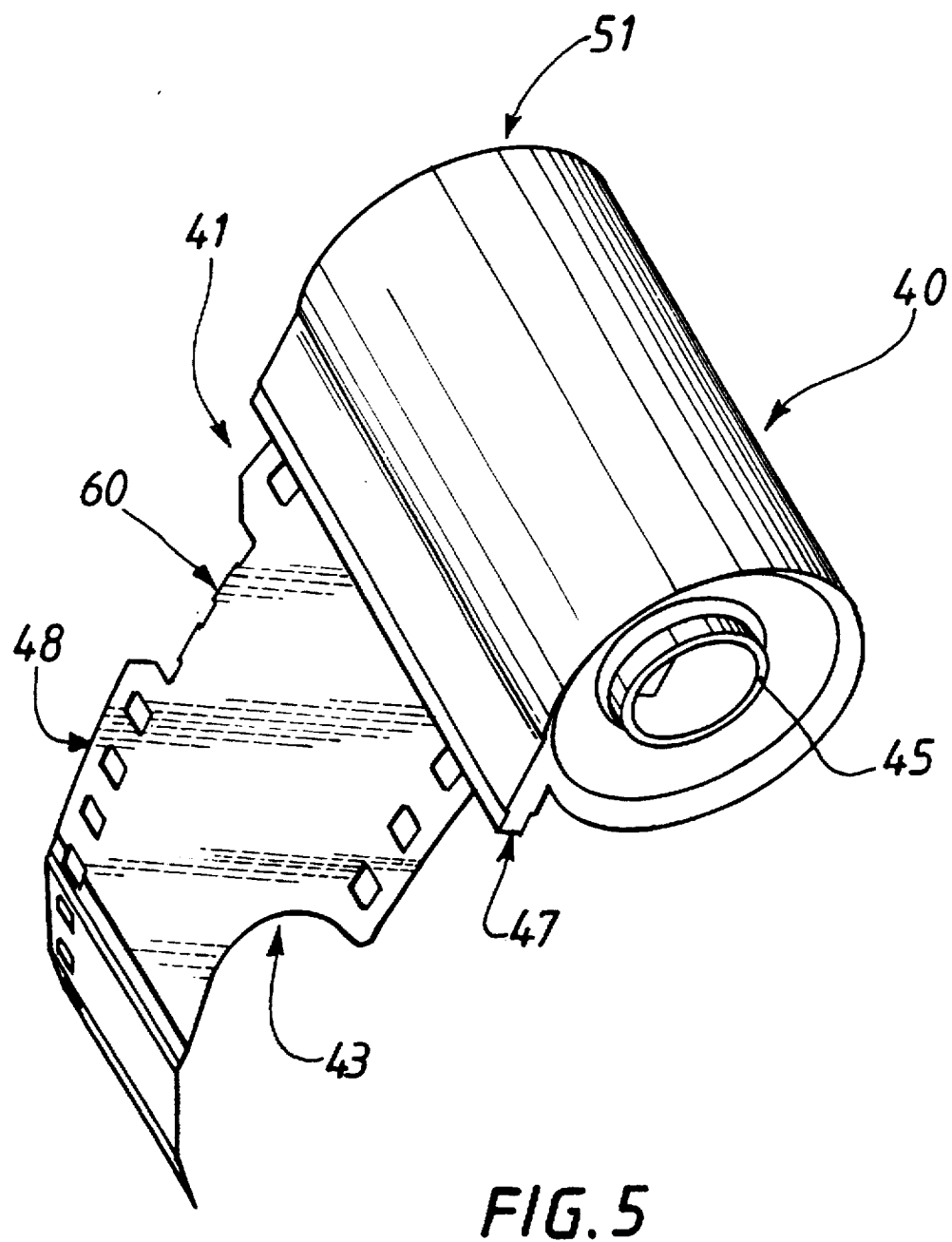
FIG. 5 depicts diagrammatically a second embodiment of the photographic film cassette according to the present invention.

Such cutting and punching operations can be carried out at different times. This is preferably effected during the assembly of the SUC camera, just before the film is loaded. For this purpose, an operator locates the perforations of the leader that are to come into contact with the toothed wheel during the hooking of the film onto the receiving spool. He then cuts the film so as to remove the material between two or three successive perforations, as depicted in FIGS. 4 and 5. The roll can then be loaded into the camera, and hooked onto the receiving spool, the perforation 60 then being located in engagement with the toothed wheel (46, FIG. 3). Preferably, the dimensions of the perforation are such that no portion of the film can be caught between a tooth on the wheel and the rear cover, when the latter is closed. All the operations described above can, of course, be carried out automatically, including the cutting out of the perforation 60.

Figure 6:
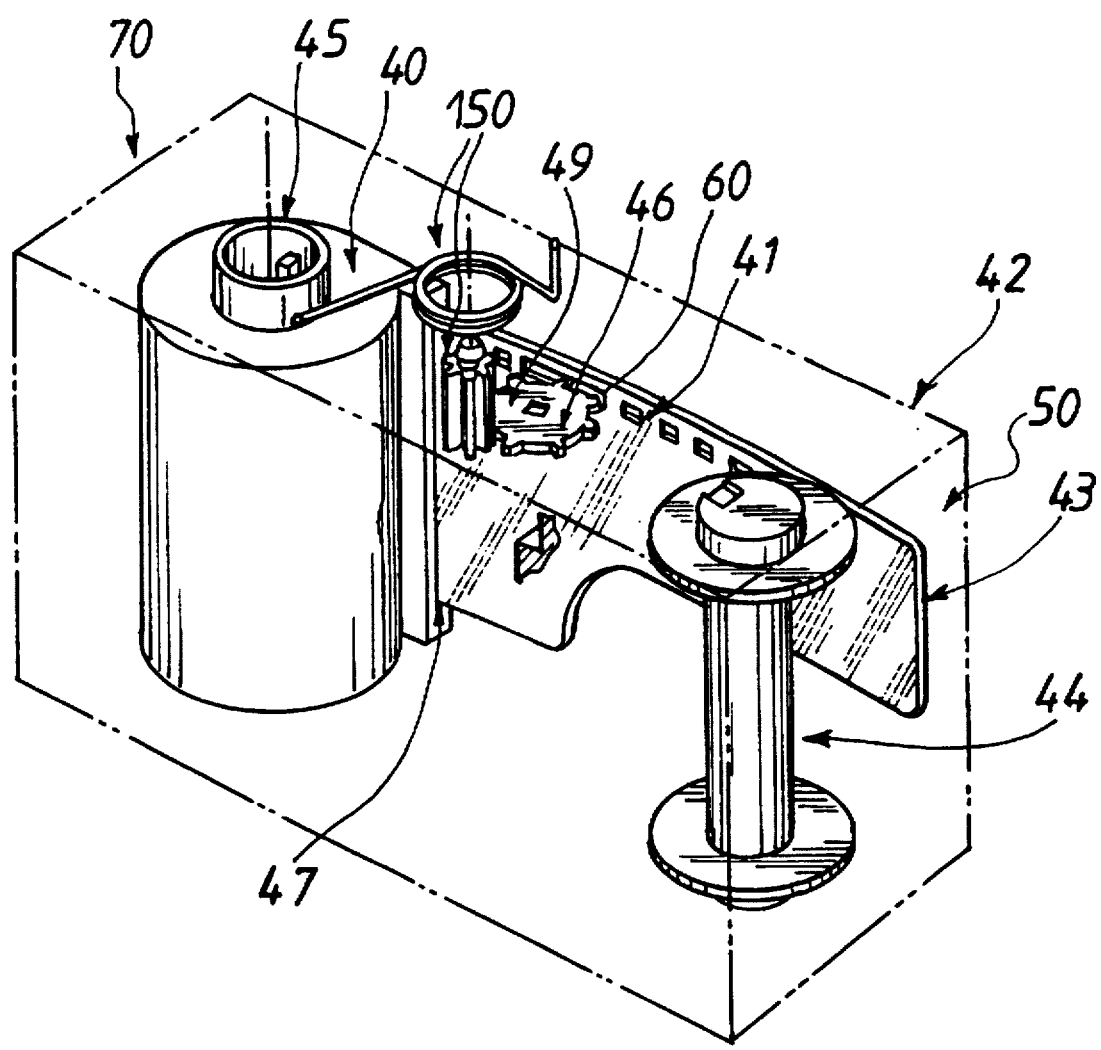
FIG. 6 depicts a camera of the type illustrated in FIGS. 1 to 3, equipped with a film cassette as depicted in FIG. 4.

A camera equipped with such a cassette is depicted in FIG. 6.

FIG. 5 depicts another embodiment of the present invention. According to this variant, the part of the film located between the edge of the perforation 60 and the corresponding edge of the film is also cut out. Typically, the width of the lateral strip situated between the outer edge of the perforations and the corresponding edge of the film is approximately 2 mm. Thus the perforation 60 takes the form of a notch formed in the edge of the film. The form of this notch should be such that the driving of the toothed wheel by the film is able to be carried out satisfactorily. A possible configuration for such a notch is depicted in FIG. 5. Such an arrangement further improves, under certain conditions, the positioning of the film on the toothed wheel during its loading.

Figure 7:
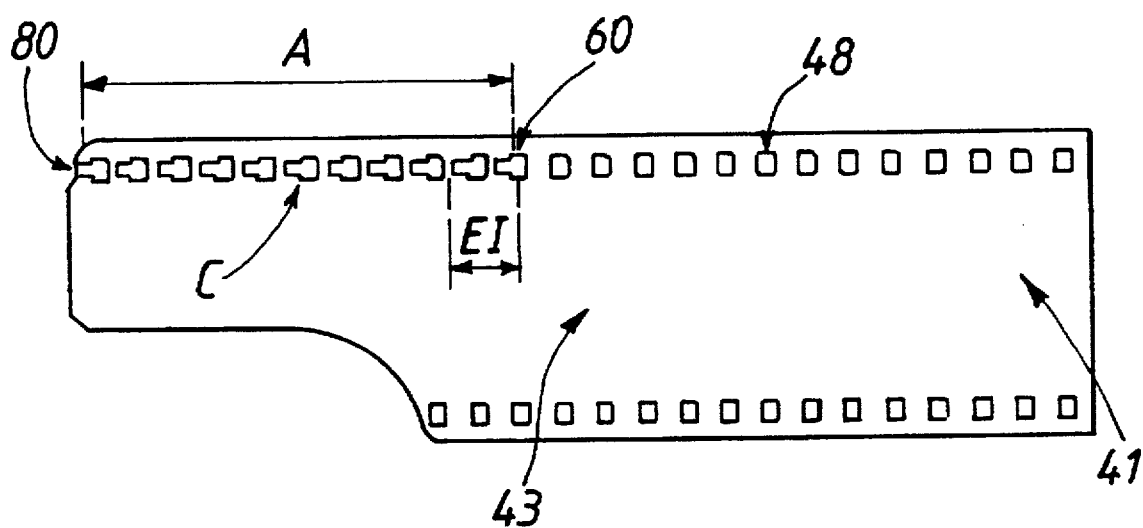
FIG. 7 depicts a third embodiment of the photographic cassette according to the invention.

According to a variant of the present invention, illustrated in FIG. 7, prior to the loading of the film, all the perforations between the area of initial engagement of the film with the toothed wheel of the camera and the free end 80 of the leader 43 are enlarged by cutting out or punching (the area of initial engagement is defined by the arrow EI and the area in which the perforations are enlarged is defined by the arrow A). The cut-cutting should, notably for reasons of synchrony, be effected on the side C of the perforations, situated at the opposite end to the film 41 (that situated nearest to the free end of the leader). By way of example, conventionally, the dimension of the perforations (along the longitudinal axis of the film) is 1.98 mm with a 2.77 mm space between the perforations. According to the invention, it is possible to reduce this space between the perforations by around two thirds, so that the perforations between the area of initial engagement of the film with the toothed wheel and the free end of the leader have a length (along the axis of the film) of approximately 4.1 mm. The reduction in the space between the perforations depends, in actual fact, on the traction exerted on the film during winding.

The invention that has just been described is particularly advantageous in that it considerably facilitates, in a simple and economical way, the loading of a film into cameras of the Single-Use type. Such a solution is particularly appropriate within the framework of a completely automated process, since it reduces considerably the film positioning and constraints enables the process to be made more reliable. Furthermore, the larger perforation has no effect on subsequent processing, developing and printing machines for the film since it is situated in an area which is routinely removed during processing. It also contributes to a significant reduction in the number of films or components damaged during the loading of the film.

The present invention has just been described with reference to preferred embodiments. It is evident that variants can be envisaged without departing from the spirit of the invention as claimed in the accompanying claims.

I claim:

1. A cassette for photographic film (40) comprising:

a) a winding spool (45) provided with flanges at each of its ends;

b) a photographic film (41) designed to be wound on said winding spool, means being provided for fixing one end of the film to the spool, said film being provided with perforations (48) formed at intervals along at least one of its longitudinal edges, and designed to cooperate with drive means (46) provided on a camera (42) adapted to receive said cassette (40), a perforated leader (43) enabling the film to be engaged with said drive means (46) of said camera for the purpose of its winding onto a receiving spool (44); and c) a cylindrical shell (51) inside which said spool (45) is mounted so as to rotate in a lightproof way, said shell having (51) a narrow lightproof opening (47) formed over substantially the whole of its length in order to allow the passage of the film;

said cassette being characterised in that at least one of the perforations (60) of the leader intended for the initial engagement of the film (41) with the drive means (46) is longer along the longitudinal axis of the film than the other perforations (48), and the leader (43) has a row of perforations (48) arranged along at least one of its longitudinal edges, each of the perforations of the row being disposed at a given distance from the corresponding edge of the film, the material situated between said longer perforation (60) and the corresponding edge of the film being removed by cutting or punching.

2. A cassette (40) according to claim 1 characterised in that said longer perforation (60) is obtained by removal of the material (61) situated between at least two successive perforations (48) in the leader (43).

3. A cassette (40) according to claim 1 characterised in that said longer perforation (60) is produced by removing the material situated between three successive perforations in the leader.

4. A cassette according to claim 1, characterised in that the perforations of the leader, situated between the area of initial engagement (EI) of the film with the drive means of the camera and the free end (80) of the leader (43) are enlarged by cutting out or punching in the area between the perforations, from the side (C) of the perforations nearest to the free end of the leader.

* * * * *